United States Patent
Born et al.

(10) Patent No.: US 10,472,070 B2
(45) Date of Patent: Nov. 12, 2019

(54) METHOD FOR PRODUCING A RAIL-SHAPED HYBRID COMPONENT, AND SUCH A HYBRID COMPONENT

(71) Applicant: Airbus Operations GmbH, Hamburg (DE)

(72) Inventors: Johannes Born, Hamburg (DE); Alexander Gillessen, Hamburg (DE); Carsten Rowedder, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 132 days.

(21) Appl. No.: 15/598,462

(22) Filed: May 18, 2017

(65) Prior Publication Data
US 2017/0334564 A1  Nov. 23, 2017

(30) Foreign Application Priority Data

May 19, 2016 (DE) .................. 10 2016 208 650

(51) Int. Cl.
*B64D 11/06* (2006.01)
*B64G 1/60* (2006.01)

(52) U.S. Cl.
CPC ............ *B64D 11/0696* (2013.01); *B64G 1/60* (2013.01)

(58) Field of Classification Search
CPC . B64D 11/0696; B64D 11/06; B29C 66/7212; B29C 66/7428; B23K 2103/18; B23K 2103/42; B23K 2103/14; B23K 2103/166; B29L 2031/003; B29L 2031/3082; B60N 2/005
See application file for complete search history.

(56) References Cited

U.S. PATENT DOCUMENTS 5,783,279 A * 7/1998 Edgson .................. B29B 11/16
139/11
6,520,706 B1 * 2/2003 McKague, Jr. ........ B29C 70/342
403/265
(Continued)

FOREIGN PATENT DOCUMENTS

DE 102006033156 1/2008
DE 102007048283 4/2009
(Continued)

OTHER PUBLICATIONS

German Search Report, dated Jul. 21, 2016 priority document.

*Primary Examiner* — Anita M King
(74) *Attorney, Agent, or Firm* — Greer, Burns & Crain, Ltd.

(57) ABSTRACT

In a method for producing a rail-shaped hybrid component, in particular for an aircraft or spacecraft, a second rail component made of a titanium material is positioned on a first bar of a first profile rail that is made of a carbon-fiber reinforced plastic material and moved in an advancing direction, in a fixed position relative to the first profile rail, such that a bar portion of the first bar is arranged between a first connecting portion of the second rail component and a second connecting portion of the second rail component, and the second rail component is cohesively connected to the first profile rail. Furthermore, the hybrid component has a first profile rail made of a carbon-fiber reinforced plastic material and a second rail component made of a titanium material.

14 Claims, 5 Drawing Sheets

(56) References Cited

U.S. PATENT DOCUMENTS

| | | | | |
|---|---|---|---|---|
| 7,207,756 B2 * | 4/2007 | Vichniakov | ............ | B23K 20/00 |
| | | | | 410/115 |
| 8,093,531 B2 * | 1/2012 | Kocik | ................ | B23K 15/0006 |
| | | | | 219/121.64 |
| 10,035,600 B2 * | 7/2018 | Vichniakov | ............... | B64C 1/20 |
| 2005/0133666 A1 * | 6/2005 | Zerner | ............... | B64D 11/0696 |
| | | | | 244/118.6 |
| 2006/0038071 A1 * | 2/2006 | Schoene | ........... | B64D 11/0696 |
| | | | | 244/118.6 |
| 2006/0283133 A1 * | 12/2006 | Westre | ...................... | E04C 3/29 |
| | | | | 52/837 |
| 2009/0130482 A1 * | 5/2009 | Kocik | ................ | B23K 15/0006 |
| | | | | 428/651 |
| 2009/0321606 A1 * | 12/2009 | Wilhelm | ............ | B60N 2/01575 |
| | | | | 248/503 |
| 2010/0141009 A1 | 6/2010 | Kirch | | |
| 2016/0130004 A1 * | 5/2016 | Vichniakov | ............... | B64C 1/20 |
| | | | | 248/503.1 |

FOREIGN PATENT DOCUMENTS

| | | |
|---|---|---|
| DE | 102009010404 | 9/2010 |
| EP | 1600246 | 11/2005 |

\* cited by examiner

METHOD FOR PRODUCING A RAIL-SHAPED HYBRID COMPONENT, AND SUCH A HYBRID COMPONENT

CROSS-REFERENCES TO RELATED APPLICATIONS

This application claims the benefit of the German patent application No. 102016208650.2 filed on May 19, 2016, the entire disclosures of which are incorporated herein by way of reference.

FIELD OF THE INVENTION

The present invention relates to a method for producing a rail-shaped hybrid component, and to such a hybrid component.

BACKGROUND OF THE INVENTION

In aircraft and spacecraft, passenger seats are usually fastened to a fastening rail. Since high demands with regard to corrosion resistance of the fastening rail are made, the latter is generally manufactured from a corrosion-resistant titanium material.

EP 1 600 246 A1 discloses a titanium/aluminum component which can be used as a seat rail, wherein a first region of the component that is made of a titanium material is cohesively connected to a second region of the component that is made of an aluminum material by means of a deep welding process. Furthermore, a method for connecting the first and the second region of the titanium/aluminum component is disclosed, wherein the first and the second region are arranged in a manner butting against one another and heat is supplied to the abutting region by a laser beam or electron beam.

SUMMARY OF THE INVENTION

It is an idea of the present invention to provide a hybrid component which has a low weight while having high mechanical component strength and high corrosion resistance, and to provide a method with which the hybrid component is able to be produced efficiently with high quality.

According to a first aspect of the invention, a method for producing a rail-shaped hybrid component, in particular for an aircraft or spacecraft, is provided. In a first step, a second rail component made of a titanium material is positioned on a first bar, extending in a longitudinal profile direction, of a first profile rail that is made of a carbon-fiber reinforced plastic material and moved in an advancing direction, in a fixed position relative to the first profile rail such that a bar portion, extending in the longitudinal profile direction, of the first bar is arranged between a first inner face of a first connecting portion of the second rail component and a second inner face, facing the first inner face and located at a distance therefrom, of a second connecting portion of the second rail component. In a further step, the second rail component is cohesively connected to the first profile rail by a predetermined force being exerted perpendicularly on a first outer face, oriented in the opposite direction to the first inner face of the first connecting portion, and ultrasonic vibration being applied parallel to the first outer face by means of a first sonotrode of an ultrasonic welding device, and simultaneously a predetermined force being exerted perpendicularly on a second outer face, oriented in the opposite direction to the second inner face of the second connecting portion, and ultrasonic vibration being applied parallel to the second outer face by means of a second sonotrode of the ultrasonic welding device.

As a result of the first profile rail being moved in the advancing direction during the positioning of the second rail component and during the connecting operation, a continuous and quick production process is produced.

Furthermore, the positioning may take place such that the first bar is arranged between the first inner face of the first connecting portion and the second inner face of the second connecting portion. In this way, within a tolerance defined by the spacing of the inner faces and a thickness of the bar, form-fitting fixing of the second rail component to the first bar is achieved with regard to a transverse profile direction extending transversely to the longitudinal profile direction. In this way, the positioning accuracy is improved. Furthermore, a contact area available for the connection of the bar to the second rail component is also enlarged by this arrangement.

As a result of the simultaneous connection of the first profile rail to the second rail component by means of two sonotrodes located opposite one another, a mechanically stable connection can be produced extremely quickly and reliably. In particular, as a result of the large contact area between the first bar and the inner faces of the connecting portions, a cohesive connection having very good mechanical properties is produced. As a result of the application of opposing forces on the outer faces of the connecting portions by means of the sonotrodes with simultaneous vibration thereof parallel to the outer faces, direct fusing of the bar with the connecting portions takes place on account of friction. Thus, any relatively small irregularities that may be present on the inner faces or on the surfaces of the bar do not matter. Therefore, it is possible to dispense with laborious preparation of the inner faces and of the bar. In this way, a particularly efficient procedure is achieved.

The sonotrodes may be in the form of spot sonotrodes which, during the connecting operation, are moved in the advancing direction from a starting position at an advancing speed, at which the first profile rail is moved in the advancing direction for a first period of time, and in the process, each produce a first discrete weld that connects the first profile rail and the second rail component. This has the advantage that, in particular, in highly mechanically loaded regions of the hybrid component, punctiform, optionally additional connecting points can be introduced.

In particular, after the production of the first weld, provision can be made for the first sonotrode to be removed from the first outer surface and the second sonotrode to be removed from the second outer surface, subsequently for the first and the second sonotrode to be moved back into the starting position, and for the predetermined force to again be exerted perpendicularly on the first outer face and ultrasonic vibration to be applied parallel to the first outer face by means of the first sonotrode, and simultaneously for the predetermined force to be exerted perpendicularly on the second outer face and ultrasonic vibration to be applied parallel to the second outer face by means of the second sonotrode, wherein the sonotrodes are moved in the advancing direction at the advancing speed for a second period of time and in the process each produce a second discrete weld that connects the first profile rail and the second rail component.

These steps can be repeated in order to produce further spot welds.

The first predetermined period of time and the second predetermined period of time can be the same length or different lengths. For example, provision can be made for the periods of time to be dependent on a local thickness of the particular connecting portion in the direction in which the forces exerted by the sonotrodes act. In general, the dependence can be configured such that the periods of time become longer with increasing thickness.

In this way, several discrete welds can be produced. The spacing thereof from one another in the longitudinal profile direction can be varied, for example, by adapting the advancing speed of the profile rail. In particular, it is thus possible to achieve a distribution of the number of welds in the longitudinal profile direction. This can be configured, in particular, such that, in highly mechanically loaded regions, the spacing between adjacent spot welds is less than in less highly mechanically loaded regions.

As an alternative to spot sonotrodes, the sonotrodes can also be in the form of rolling sonotrodes, wherein, during the connecting process, a first sonotrode roller of the first sonotrode bears against the first outer face and in the process produces a first longitudinal weld seam that extends in the longitudinal profile direction and connects the first profile rail and the second rail component, and a second sonotrode roller of the second sonotrode bears against the second outer face and in the process produces a second longitudinal weld seam that extends in the longitudinal profile direction and connects the first profile rail and the second rail component. The production of longitudinal weld seams by means of rolling sonotrodes has the advantage that this operation can be integrated particularly easily into a continuous production process. For example, the advancing speed can always be kept constant. Furthermore, the longitudinal weld seams have very high mechanical loadability, since these connect the components together over a large connecting area, with the result that the forces acting on the connection per unit area are reduced.

Provision can furthermore be made for the first profile rail to have a greater length with regard to the longitudinal profile direction than the second rail component, wherein a further second rail component is positioned on the first bar of the first profile rail in a fixed position relative to the first profile rail such that a further bar portion, extending in the longitudinal profile direction of the bar, is arranged between the first inner face of the first connecting portion of the further second rail component and the second inner face of the second connecting portion of the further second rail component. Furthermore, the further second rail component is cohesively connected to the first profile rail by a predetermined force being exerted perpendicularly on the first outer face of the first connecting portion of the further second rail component, and ultrasonic vibration being applied parallel to this first outer face by means of the first sonotrode, and simultaneously, a predetermined force being applied perpendicularly on the second outer face of the second connecting portion of the further second rail component, and ultrasonic vibration being applied parallel to this second outer face by means of the second sonotrode.

In particular, the further second rail component can be positioned such that the second rail components are arranged in a manner butting against one another with regard to the longitudinal profile direction. Alternatively, the positioning can take place such that the rail components are at a predetermined spacing with regard to the longitudinal profile direction, the spacing being in particular at most 10 percent of the length, for example at most 5 percent of the length and, for example, at most 1 percent of the length of one of the second rail components.

Generally, the further second rail component is positioned such that it is located adjacent to the second rail component that is already positioned on the first bar and optionally connected thereto.

Provision can be made for the second rail component and the one or more further second rail components to first of all be positioned on the first profile rail in a manner following one another and subsequently for the positioned second rail components to be connected to the first profile rail, for example in the order in which the second rail components were positioned. Provision can also be made for, in each case, one second rail component to be successively positioned and connected to the first profile rail and only then for a further second rail component to be positioned. In principle, there can also be a temporal overlap between the connecting of a second rail component and the positioning of a further second rail component. The further second rail component can thus be positioned before or after the second rail component has been connected to the first profile rail, or at least sometimes at the same time as this.

As a result of several second rail components having a short length being positioned on a first profile rail which has a greater length than the respective second rail components, automatic positioning on the profile rail moved in the advancing direction can take place in a simple manner.

Of course, it is possible for the first profile rail and the second rail components also to be the same length. This has the advantage, for example, that, with regard to the longitudinal profile direction, there are no joint faces between adjacent second rail components, through which dirt or liquid could reach the first profile rail. In this configuration, only a single positioning step is also necessary, with the result that the method can be speeded up.

After the connecting operation, the first profile rail and/or the second rail component can be cut in each case to a predetermined length with regard to the longitudinal profile direction, such that an end face of the second rail component and an end face of the first profile rail are arranged flush with one another with regard to the longitudinal profile direction. This has the advantage that, for example, overhangs, caused by the positioning or other tolerances, of the first profile rail and the second rail component with respect to one another can be corrected easily.

Further, provision can be made for the first profile rail to be moved out of a pultrusion device in which the profile rail was produced by a pultrusion process. As a result, a manufacturing method is provided in which, in a single continuous process, the profile rail is both produced and processed with the second rail component to form a hybrid component. It is possible, for example, to provide what is known as a CCM process as the pultrusion process, where "CCM" stands for Continuous Compression Molding.

A further aspect of the invention relates to a hybrid component, in particular for an aircraft or spacecraft, having a first profile rail that extends in a longitudinal profile direction and is made of a carbon-fiber reinforced plastic material, the first profile rail having a first bar, and a second rail component made of a titanium material, the second rail component having a first connecting portion with a first inner face and a second connecting portion with a second inner face that faces the first inner face and is located at a distance therefrom, wherein a bar portion, extending in the longitudinal profile direction of the first bar of the first profile rail, is arranged between the first inner face of the first connecting portion and the second inner face of the second connecting portion, and the first and the second connecting portion of the second rail component are each cohesively connected to the first bar of the first profile rail.

The hybrid component can have been produced, in particular, according to the above-described production method.

Since the first profile rail is formed from a carbon-fiber reinforced plastic material, the hybrid component has a particularly low weight. As a result of the use of titanium material for the second profile rail, the latter has very high mechanical loadability, in particular with respect to frictional loads acting thereon. As a result of the provision of a cohesive connection, for example, a connection produced by ultrasonic welding, as described above, between the first bar and the connecting portions, the hybrid component can be produced in a particularly efficient manner, for example with the above-described method.

Since, furthermore, the first bar of the profile rail is arranged between the two mutually facing inner faces of the connecting portions of the second rail component and is connected in each case to the first and the second connecting portion, a very mechanically loadable connection is provided between the individual components.

The first and the second connecting portion of the second rail component can, in particular, each be cohesively connected to the first bar of the first profile rail by at least one discrete weld. This has the advantage that the connection can be regionally adapted to the expected mechanical load on the hybrid component. For example, a greater number of welds can be provided in highly mechanically loaded regions of the hybrid component than in less highly mechanically loaded regions.

Alternatively thereto, provision can also be made for the first and the second connecting portion of the second rail component to each be cohesively connected to the first bar of the first profile rail by a longitudinal weld seam extending in the longitudinal profile direction. The longitudinal weld seams have, in particular, very high mechanical loadability, since they connect the components together over a large connecting area, with the result that the forces acting on the connection per unit area are reduced.

Furthermore, provision can be made for the hybrid component, in addition to the second rail component, to have at least one further second rail component, wherein a further bar portion of the first bar of the first profile rail is arranged between the first inner face of the first connecting portion of the further second rail component and the second inner face of the second connecting portion of the further second rail component, and the first and the second connecting portion of the further second rail component are each cohesively connected to the first bar of the first profile rail.

In particular, in this case, the second rail components can be arranged in a manner butting against one another with regard to the longitudinal profile direction. Alternatively thereto, provision can be made for the rail components to be at a predetermined spacing from one another with regard to the longitudinal profile direction, the spacing being, in particular, at most 10 percent of the length, for example, at most 5 percent of the length and, for example, at most 1 percent of the length of one of the second rail components. In general, the second rail components are arranged adjacent to one another with regard to the longitudinal profile direction.

Of course, provision can also be made for the first profile rail and the second profile rail to be the same length.

The first and the second connecting portion of the second rail component can, in particular, be connected together by a cross bar extending in a transverse profile direction extending transversely to the longitudinal profile direction. This has the advantage that the cross bar provides a mounting face for further functional components of the second rail component. However, it is also conceivable, for example, for the connecting portions to be connected directly together or, instead of a cross bar, to be connected together by a differently designed connecting component.

Furthermore, provision can be made for the second rail component to have a guide device having a first guide part protruding from the cross bar and a second guide part protruding from the cross bar and arranged in a manner spaced apart from the first guide part with regard to the transverse profile direction, wherein the first guide part is connected to the cross bar by a first end portion and has, in a second end portion located at the opposite end from the first end portion, a first end piece extending in the direction of the second guide part, and the second guide part is connected to the cross bar by a first end portion and has, in a second end portion located at the opposite end from the first end portion, a second end piece extending in the direction of the first guide part, wherein the guide device and the connecting portions are arranged on opposite sides of the cross bar.

The guide device is an example of a functional component of the second rail component. In particular, the guide device can be provided to guide and/or fix a seat for an aircraft.

The first profile rail can, in particular, have a second bar extending in the transverse profile direction, the second bar being connected to the first bar. In particular, the second bar can be arranged in an end portion of the bar that is located at the opposite end from the bar portion at which the second rail component is arranged. In this way, a functional face for fastening the hybrid component, for example, to a fastening structure of a fuselage structure of an aircraft or spacecraft, is formed.

A further aspect of the invention relates to an aircraft or spacecraft having a hybrid component according to one of the above-described embodiments. The hybrid component can be provided, in particular, for connecting passenger seats to a fastening structure connected to the aircraft fuselage.

With regard to direction indications and axes, in particular direction indications and axes which relate to the extension of physical structures, an extension of an axis, direction or structure "along" another axis or structure or "in" another direction is understood herein as meaning that these, in particular the tangents that arise in a particular position of the structures, each extend at an angle of less than or equal to 45 degrees, for example less than or equal to 30 degrees and, for example, parallel to one another.

With regard to direction indications and axes, in particular direction indications and axes which relate to the extension of physical structures, an extension of an axis, direction or structure "transversely" to another axis, direction or structure is understood herein as meaning that these, in particular the tangents that arise in a particular position of the structures, each extend at an angle of greater than or equal to 45 degrees, for example greater than or equal to 60 degrees and for example perpendicularly to one another.

BRIEF DESCRIPTION OF THE DRAWINGS

In the following text, the invention is explained with reference to the figures of the drawings. In the figures.

In the figures, the same reference signs denote identical or functionally identical components, unless otherwise stated.

DETAILED DESCRIPTION OF THE PREFERRED EMBODIMENTS

According to one aspect of the invention, a method for producing a rail-shaped hybrid component 1 is provided. Various steps of the method are illustrated in FIGS. 1 to 6. The hybrid component 1 that is described in more detail in the following text and is producible, in particular, with the method according to the invention, can be provided, in particular, for installation in an aircraft or spacecraft.

Figure 1:
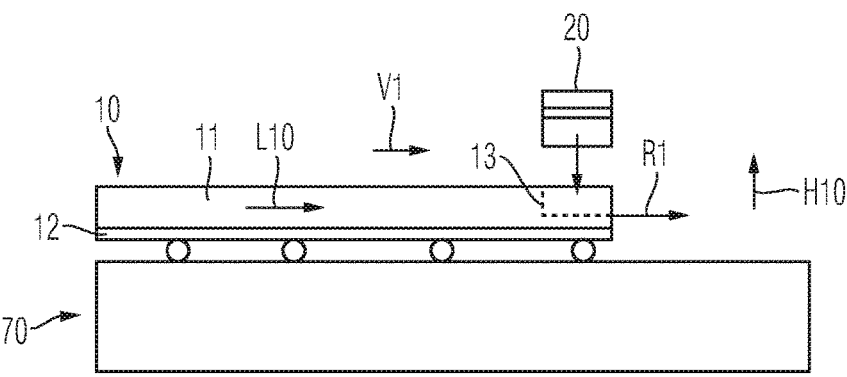
FIG. 1 shows the step of positioning a second rail component on a first profile rail moved in an advancing direction, according to one exemplary embodiment of a method according to the present invention.

As schematically illustrated in FIG. 1, in the method, a second rail component 20 made of a titanium material is positioned on a first bar 11 extending in a longitudinal profile direction L10 of a first profile rail 10 that is made of a carbon-fiber reinforced plastic material, and moved in an advancing direction R1, in a fixed position relative to the first profile rail 10.

The positioning can take place, in particular, by means of a positioning device, not illustrated, for example in the form of a movable gripping arm or the like.

Figure 2:
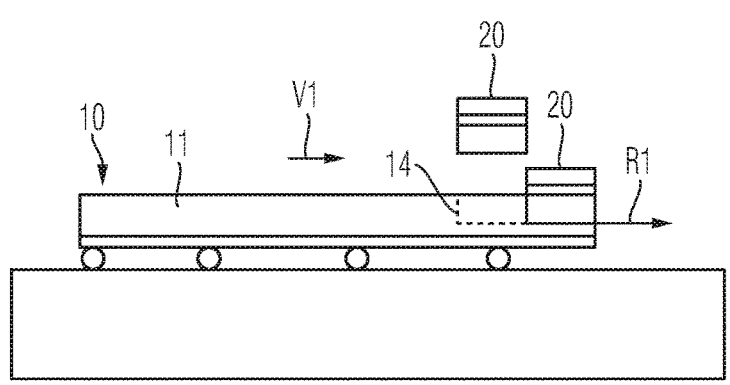
FIG. 2 shows the step of positioning a further second rail component according to a further exemplary embodiment of a method according to the present invention.
Figure 3:
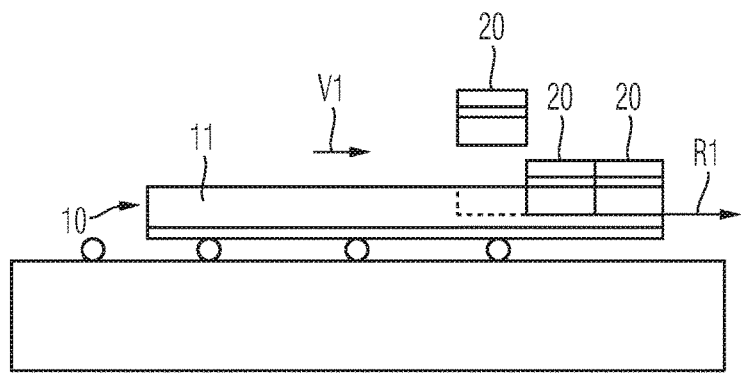
FIG. 3 shows the step of positioning a further second rail component according to the exemplary embodiment shown in FIG. 3.
Figure 4:
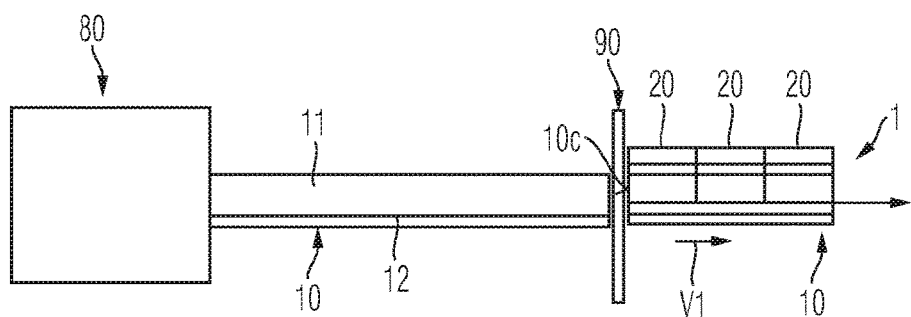
FIG. 4 shows a schematic illustration of production of the first profile rail by means of a pultrusion process and of cutting the first profile rail to length according to a further exemplary embodiment of a method according to the present invention.

As is shown schematically, and by way of example in FIGS. 1 to 3, the first profile rail 10 can be moved by means of a transporting device 70. However, provision can also be made for the first profile rail 10 to be moved out of a pultrusion device 80 in which the profile rail 10 was produced in a pultrusion process.

The carbon-fiber reinforced plastic material of the first profile rail 10 has a multiplicity of carbon fibers which are embedded in a plastic matrix.

The profile rail 10 can, in particular, be moved at a predetermined advancing speed V1. For example, the advancing speed V1 may be constant during the method. However, provision can also be made for the advancing speed V1 to change during the method, in particular for the advancing speed to be different during different steps of the method.

The profile rail 10 has, in particular, a first bar 11 extending in the longitudinal profile direction L10. The first bar 11 furthermore extends in a vertical profile direction H10 extending transversely to the longitudinal profile direction L10. As is shown by way of example, in particular in FIGS. 5, 6 and 8, the first bar 11 can have a rectangular cross section. However, it is also conceivable for the first bar 11 to have, for example, a trapezoidal or triangular cross section. Generally, the first bar 11 has a first side face 11a extending in the longitudinal profile direction L10, and a second side face 11b located on the opposite side from the first side face 11a with regard to a transverse profile direction C10 extending transversely to the vertical profile direction H10.

While the first profile rail 10 is being moved in the advancing direction R1, the advancing direction R1 and the longitudinal profile direction L10 extend along one another and, for example, parallel to one another.

The second rail component 20 has a first connecting portion 21 with a first inner face 21i and a second connecting portion 22 with a second inner face 22i that faces the first inner face 21i of the first connecting portion 21 and is located at a distance therefrom. The first and the second inner face 21i, 22i each extend in a longitudinal rail-component direction L20 and in a vertical rail-component direction H20 extending transversely thereto. Furthermore, the first and the second inner face 21i, 22i are arranged at a spacing d20 from one another with regard to a transverse rail-component direction C20 extending transversely to the vertical rail-component direction H20.

Figure 7:
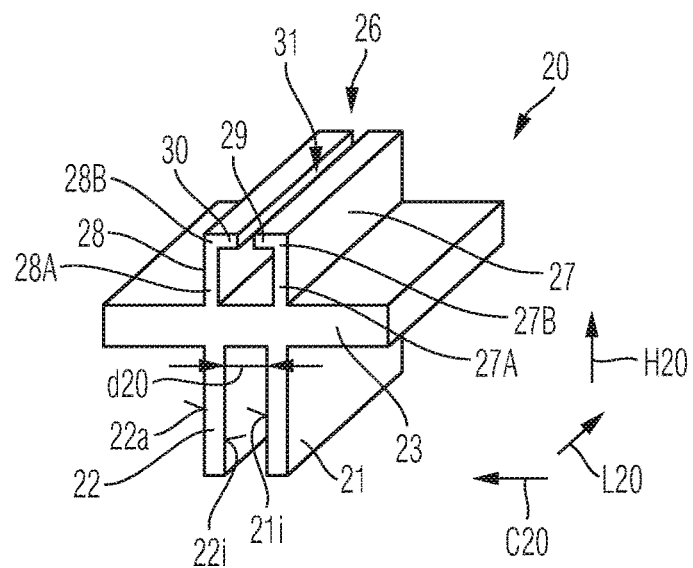
FIG. 7 shows a perspective view of the second rail component of the hybrid component according to one exemplary embodiment according to the present invention.

The first and the second connecting portion 21, 22 of the second rail component 20 can, in particular, each be configured as a leg with an approximately rectangular cross section, as is shown, in particular, in FIG. 7. However, it is also conceivable for the connecting portions 21, 22 to have a non-rectangular, for example trapezoidal, cross-sectional profile, at least regionally.

Suitable titanium materials for the second rail component 20 are also, for example, titanium-aluminum alloys.

The second rail component 20 is positioned on the first profile rail 10, in particular, such that a bar portion 13, extending in the longitudinal profile direction L10, of the first bar 11 is arranged between the first inner face 21i of the first connecting portion 21 and the second inner face 22i of the second connecting portion 22.

The positioning of the second rail component 20 on the first profile rail 10 moved in the advancing direction R1 comprises, in particular, positioning the second rail component 20 in a fixed position relative to the first profile rail 10, in particular with regard to the longitudinal profile direction L10. In particular, after positioning, the second rail component 20 is moved at the same advancing speed V1 as the first profile rail 10.

Furthermore, provision can, in particular, be made for a thickness d11 of the bar 10 to form an oversize in the region of the bar portion 13 with regard to the spacing d20 of the first and the second inner face 21i, 22i from one another, in particular such that the bar portion 13 and the inner faces 21i, 22i form an interference fit, such that, after the second rail component 20 has been positioned on the first profile rail 10, the first inner face 21i bears at least partially against the first side face 11a of the first bar 11 and the second inner face 21i bears at least partially against the second side face 11b of the first bar 11.

Figure 5:
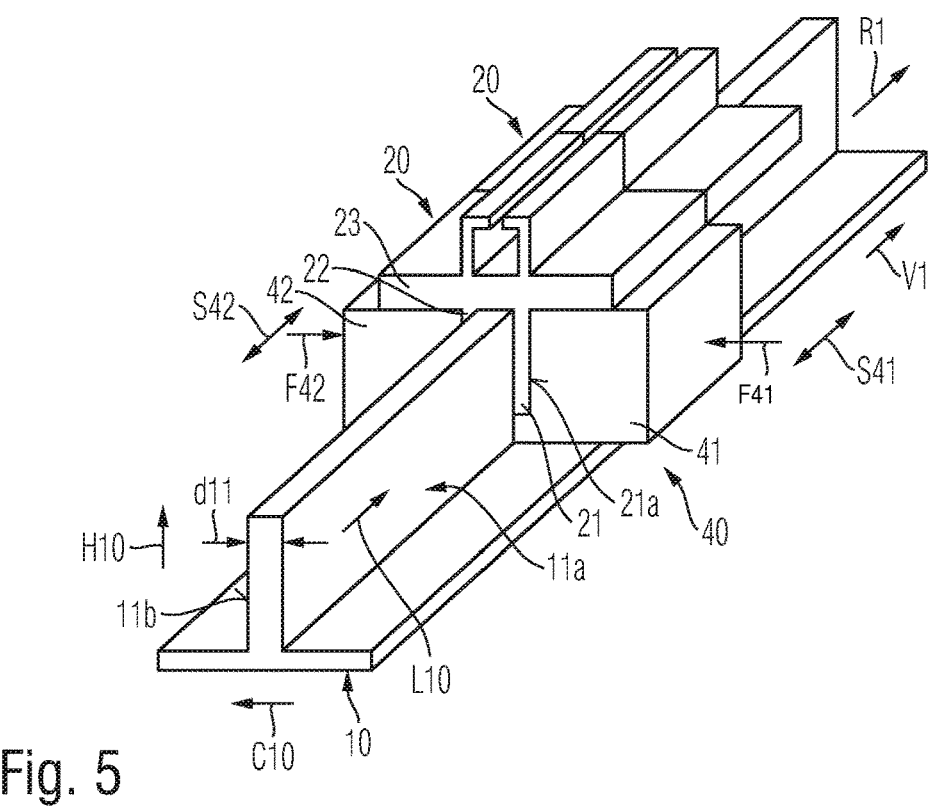
FIG. 5 shows the step of connecting according to one exemplary embodiment of the method according to the present invention.
Figure 6:
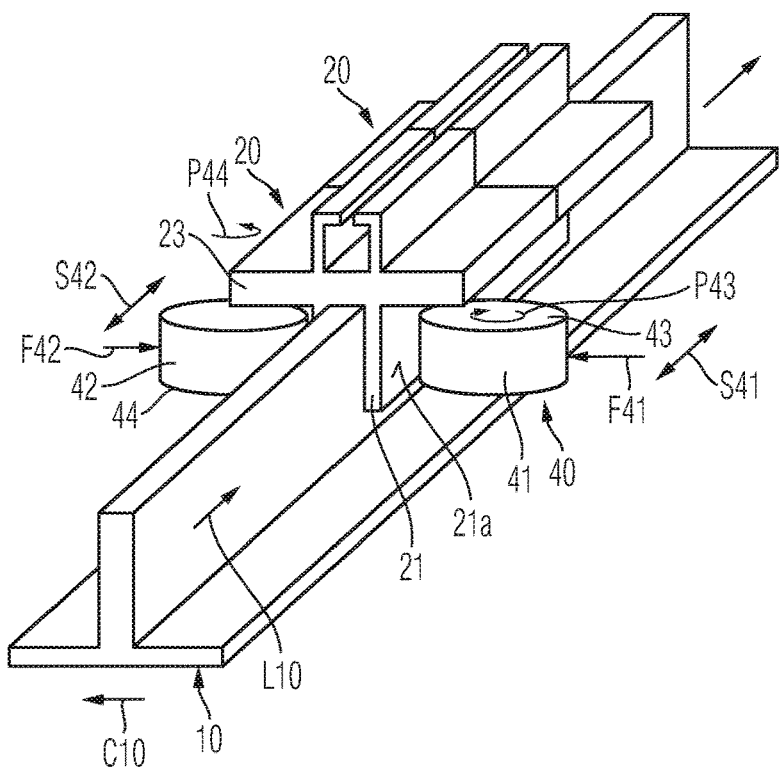
FIG. 6 shows the step of connecting according to an alternative exemplary embodiment of the method according to the present invention.

As is illustrated schematically and by way of example in FIGS. 5 and 6, after the positioning, the second rail component 20 is cohesively connected to the first profile rail 10 by a predetermined force F41 being exerted perpendicularly on a first outer face 21a oriented in the opposite direction to the first inner face 21i of the first connecting portion 21, and ultrasonic vibration S41 being applied parallel to the first outer face 21a by means of a first sonotrode 41 of an ultrasonic welding device 40. At the same time, a predetermined force F42 is exerted perpendicularly on a second outer face 22a oriented in the opposite direction to the second inner face 22i of the second connecting portion 22, and ultrasonic vibration S42 is applied parallel to the second outer face 22a by means of a second sonotrode 42 of the ultrasonic welding device 40.

The forces F41, F42 exerted on the outer surfaces 21a, 22a of the connecting portions 21, 22 of the second rail components 20 by means of the sonotrodes 41, 42 are directed towards one another, in particular in the transverse profile direction C10. As a result, the inner faces 21i, 22i are pressed against the side faces 11a, 11b of the first bar 11. The forces F41, F42 are, in particular, directed perpendicularly to a region of the respective outer surface 21a, 22a with which the respective sonotrode 41, 42 is in contact.

The ultrasonic vibrations of the sonotrodes 41, 42 can, as shown schematically by the arrows S41, S42 in FIGS. 5 and 6, comprise a vibratory movement of the sonotrodes 41, 42 in the longitudinal profile direction L10. However, it is also conceivable for a vibratory movement to take place, for example, in the vertical profile direction H10. Generally, ultrasonic vibration S41, S42 takes place parallel to the respective outer surface 21a, 22a. In this case, the vibratory movement is directed parallel to a region of the respective outer surface 21a, 22a with which the respective sonotrode 41, 42 is in contact.

The frequency of the ultrasonic vibration can lie, in particular, in a range between 18 kilohertz and 1 gigahertz.

As is schematically illustrated in FIG. 5, the sonotrodes 41, 42 can be in the form of spot sonotrodes. While the first profile rail 10 is being connected to the second rail component, the spot sonotrodes can be moved in the advancing direction R1 from a starting position at the advancing speed, at which the first profile rail 10 is moved in the advancing direction, for a first period of time and each produce a first discrete weld 2 that connects the first profile rail 10 and the second rail component 20, as is schematically illustrated by way of example in FIG. 9. In particular, a first discrete weld 2 is produced starting from the first outer face 21a and a first discrete weld is also produced starting from the second outer face 22a.

The starting position of the sonotrodes 41, 42 in the form of spot sonotrodes should be understood as being a position of the sonotrodes with regard to the advancing direction R1. In the starting position, the sonotrodes 41, 42 are in contact with the outer surfaces 21a, 22a.

Following the production of the first weld 2, it is possible, in particular, to provide for the first sonotrode 41 to be removed from the first outer surface 21a and for the second sonotrode 42 to be removed from the second outer surface 22a, and subsequently for the first and the second sonotrode 41, 42 to be moved back into the starting position. With the sonotrodes positioned back in the starting position, it is again possible for the predetermined force F41 to be exerted perpendicularly on the first outer face 21a and ultrasonic vibration S41 to be applied parallel to the first outer face 21a by means of the first sonotrode 41 and simultaneously the predetermined force F42 to be applied perpendicularly on the second outer face 22a and ultrasonic vibration S42 to be applied parallel to the second outer face 22a by means of the second sonotrode 42. In this case, the sonotrodes 41, 42 are moved in the advancing direction R1 at the advancing speed for a second period of time, and in the process, each produce a second discrete weld 3, 4 connecting the first profile rail 10 and the second rail component 20.

These steps can be repeated to produce further discrete welds.

The first predetermined period of time and the second predetermined period of time can be the same length or different lengths. For example, provision can be made for the periods of time to be dependent on a local thickness of the respective connecting portion 21, 22 in the direction in which the force F41 or F42 acts. Generally, the dependence can be configured such that the periods of time become longer with increasing thickness.

As an alternative to spot sonotrodes, provision can also be made for the sonotrodes 41, 42 to be in the form of rolling sonotrodes, as shown schematically and by way of example in FIG. 6. In this case, during the connecting process, provision can be made for a first sonotrode roller 43 of the first sonotrode 41 to bear against the first outer face 21a and, in the process, produce a first longitudinal weld seam 5 that extends in the longitudinal profile direction L10 and connects the first profile rail 10 and the second rail component 20, and for a second sonotrode roller 44 of the second sonotrode 42 to bear against the second outer face 22a and, in the process, produce a second longitudinal weld seam that extends in the longitudinal profile direction L10 and connects the first profile rail 10 and the second rail component 20.

The sonotrode rollers 43, 44 roll, in particular, on the outer surfaces 21a, 22a, as is indicated by the arrows P43, P44 in FIG. 6.

Figure 9:
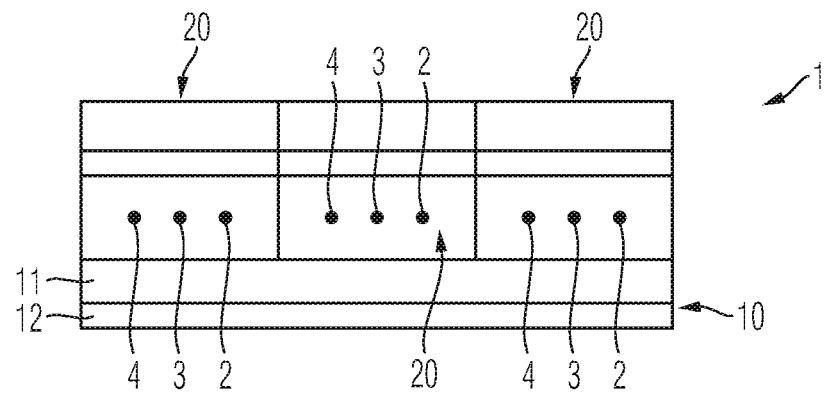
FIG. 9 shows a side view of an exemplary embodiment of the hybrid component according to the present invention.
Figure 10:
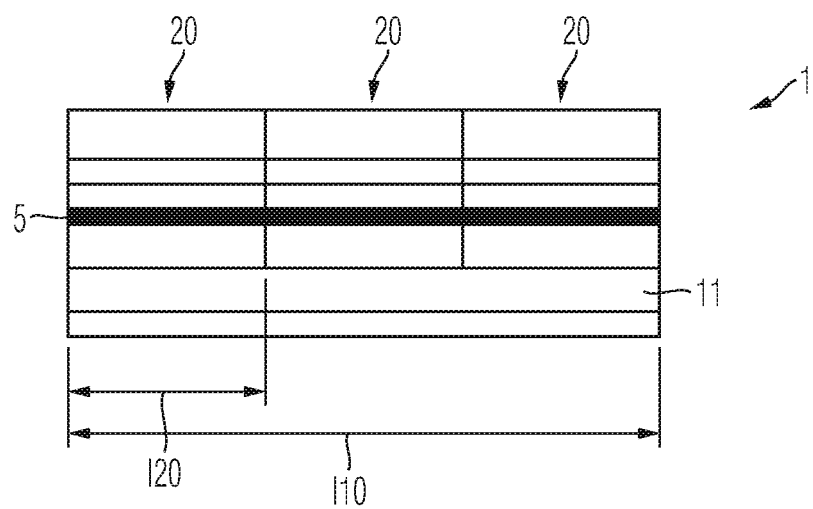
FIG. 10 shows a side view of a further exemplary embodiment of the hybrid component according to the present invention.

As is shown, in particular, in FIGS. 9 and 10, provision can be made for the first profile rail 10 to have a greater length 110 with regard to the longitudinal profile direction L10 than the second rail component 20. In this case, in particular before or after the second rail component 20 is connected to the first profile rail 10, provision can be made for a further second rail component 20 to be positioned on the first bar 11 of the first profile rail 10, as is shown schematically in FIGS. 2 and 3.

The further second rail component 20 is positioned on the first profile rail 10 in a fixed position relative to the latter, such that a further web portion 14 of the web 11 is arranged between the first inner face 21i of the first connecting portion 21 of the further second rail component 20 and the second inner face 22i of the second connecting portion 22 of the further second rail component 20. In particular, the further second rail component 20 can be positioned such that the second rail components 20 are arranged in a manner abutting against one another with regard to the longitudinal profile direction L10. Alternatively, the positioning can take place such that the second rail component 20 already positioned on the profile rail, and the further second rail component 20, are at a predetermined spacing with regard to the longitudinal profile direction L10, the spacing being, in particular, at most 10 percent of the length 120 of the second rail component 20, for example, at most 5 percent of the length 120 of the second rail component 20 and, for example, at most 1 percent of the length 120 of the second rail component 20. In the event that the second rail components 20 have different lengths 120 from one another, the predetermined spacing is, at most, 10 percent of the length 120 of the second rail component 20, for example, at most, 5 percent of the length 120 of the second rail component 20 and, for example, at most, 1 percent of the length 120 of the shortest second rail component 20 used.

Following the positioning of the further second rail component 20, the further second rail component 20 is cohesively connected to the first profile rail 10 by a predetermined force F41 being exerted perpendicularly on the first outer face 21a of the first connecting portion 21 of the further second rail component 20 and ultrasonic vibration S41 being applied parallel to this first outer face 21a by means of the first sonotrode 41, and simultaneously a predetermined force F42 being exerted perpendicularly on the second outer face 22a of the second connecting portion 22 of the further second rail component 20 and ultrasonic vibration S42 being applied parallel to this second outer face 22a by means of the second sonotrode 41.

Provision can be made for the second rail component 20 and the one or more further second rail components 20 to first of all be positioned one after another on the first profile rail 10 and, subsequently, for the positioned second rail components 20 to be connected to the first profile rail 10, for example in the order in which the second rail components 20 were positioned. Provision can also be made for, in each case, one second rail component 20 to be successively positioned and connected to the first profile rail 10, and only then for a further second rail component 20 to be positioned. In principle, there can also be a temporal overlap between the connecting of a second rail component 20 and the positioning of a further second rail component 20.

After the connecting operation, the first profile rail 10 and/or the second rail component 20 can be cut to a predetermined length 110, 120 with regard to the longitudinal profile direction L10. For this purpose, as illustrated schematically in FIG. 4, a cutting device 90, for example in the form of a saw, a thermal cutting device or the like, can be used. In particular, the cutting to length can take place such that an end face 20a of the second rail component 20 and an end face 10c of the first profile rail 10 are arranged flush with one another with regard to the longitudinal profile direction L10.

Figure 11:
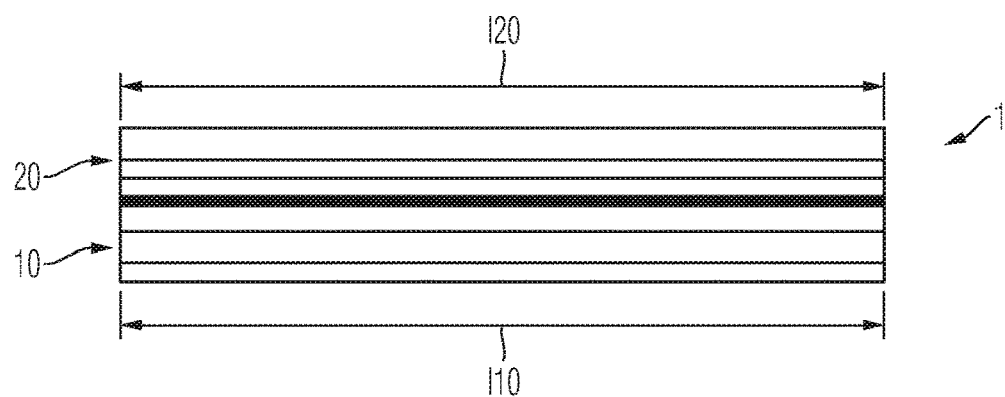
FIG. 11 shows a side view of a further exemplary embodiment of the hybrid component according to the present invention.

In particular, provision can be made for the first profile rail 10 to be cut to a length 110 which corresponds to the length 120 of a second rail component 20 connected thereto, as is shown by way of example in FIG. 11, or for the first profile rail 10 to be cut to a length 110 which corresponds to the sum of the lengths 120 of the plurality of second rail components 20 connected to the first profile rail 10, as is illustrated by way of example in FIGS. 9 and 10. Alternatively, however, a second rail component 20 that protrudes beyond the end face 10c of the first profile rail 10 with regard to the longitudinal profile direction L10 can be cut to a length 120 such that the end face 20a, formed by the cutting to length, of the second rail component 20 is flush with the end face 10c of the first profile rail 10 with regard to the longitudinal profile direction L10. Furthermore, flush end faces 10c, 20a of the first profile rail 10 and of the second rail component 20 can be produced in that these are cut in the connected state at a cutting point at which the first profile rail 10 and the second rail component overlap with regard to the longitudinal profile direction L10.

The cutting to length can generally take place in one or in both opposite end regions, with regard to the longitudinal profile direction, of the first profile rail 10 and of the second rail component 20.

According to a further aspect, a hybrid component 1 is provided. This can be produced, in particular, in accordance with the above-described method.

Figure 8:
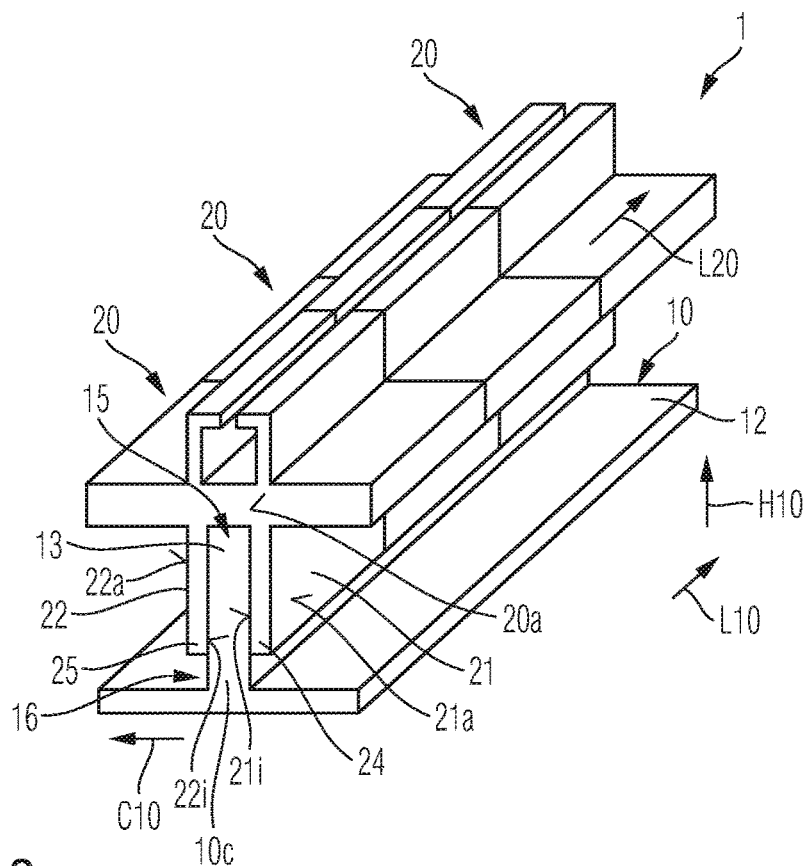
FIG. 8 shows a perspective view of an exemplary embodiment of the hybrid component according to the present invention.

As shown in particular in FIG. 8, the hybrid component has the first profile rail 10 that extends in the longitudinal profile direction L10 and is made of a carbon-fiber reinforced plastic material, having the first bar 11. Furthermore, the hybrid component has the second rail component 20 made of a titanium material. The second rail component 20 has the first connecting portion 21 with the first inner face 21i and the second connecting portion 22 with the second inner face 22i that faces the first inner face 21i and is located at a distance therefrom.

As is shown by way of example in FIG. 8, the bar portion 13, extending in the longitudinal profile direction L10, of the first bar 11 of the first profile rail 10 is arranged between the first inner face 21i of the first connecting portion 21 and the second inner face 22i of the second connecting portion 22. Furthermore, the first and the second connecting portion 21, 22 of the second rail component 20 are each cohesively connected to the first bar 11 of the first profile rail 10.

The first and the second connecting portion 21, 22 extend, in particular, from a first end portion 15 of the first bar 11, in the vertical profile direction H10. In particular, provision can be made for the first bar 11 to protrude, by way of a second end portion 16 located at the opposite end from the first end portion 15 with regard to the vertical profile direction H10, in each case beyond a first end portion 24 of the first connecting portion 21 and beyond a first end portion 25 of the second connecting portion 22.

As has already been described above by way of the method, the first and the second connecting portion 21, 22 of the second rail component 20 can each be cohesively connected to the first bar 11 of the first profile rail 10 by at least one discrete weld 2, 3, 4, as is shown by way of example in FIG. 9. The discrete welds 2, 3, 4 can be produced, in particular, by ultrasonic welding, for example as described above.

Alternatively, provision can also be made for the first and the second connecting portion 21, 22 of the second rail component 20 each to be cohesively connected to the first bar 10 of the first profile rail 10 by a longitudinal weld seam 5 extending in the longitudinal profile direction L10, as is shown by way of example in FIGS. 10 and 11. The longitudinal weld seams 5 can be produced, in particular, by ultrasonic welding, for example as described above, by means of rolling sonotrodes.

As is shown by way of example in FIGS. 8 to 10, provision can be made for the hybrid component 1 to have a plurality of second rail components 20. In particular, in addition to the second rail component 20, it can have at least one further second rail component 20, wherein a further bar portion 14 of the first bar 11 of the first profile rail 10 is arranged between the first inner face 21i of the first connecting portion 21 of the further second rail component 20 and the second inner face 22i of the second connecting portion 22 of the further second rail component 20. The first and the second connecting portion 21, 22 of the further second rail component 20 are each cohesively connected to the first bar 11 of the first profile rail 10. In particular, the cohesive connection of the further second rail component 20 to the first bar 11 of the first profile rail 10 can be realized, for example as shown in FIG. 8, by discrete welds 2, 3, 4 or by longitudinal weld seams 5, as shown, for example, in FIG. 10.

In particular, provision can be made for the second rail components 20 to be arranged in a manner abutting against one another with regard to the longitudinal profile direction L10, as is shown schematically in FIGS. 8 to 10. Alternatively, provision can be made for two second rail components 20 that are located adjacently in the longitudinal profile direction L10 to be at a predetermined spacing with regard to the longitudinal profile direction L10, the spacing being, in particular, at most 10 percent of the length 120, for example, at most 5 percent of the length 120 and, for example, at most 1 percent of the length 120 of one of the second rail components 20. In the event that the second rail components 20 have different lengths 120 from one another, the predetermined spacing is, at most, 10 percent of the length 120, for example, at most, 5 percent of the length 120 and, for example, at most, 1 percent of the length 120 of the shortest of the second rail components 20.

FIG. 7 shows, by way of example, an exemplary embodiment of the second rail component 20. As is shown therein, the first and the second connecting portion 21, 22 can each be in the form of a leg extending in the vertical rail-component direction H20. Furthermore, provision can be made for the first and the second connecting portion 21, 22 of the second rail component 20 to be connected together by a cross bar 23 extending in the transverse profile direction C10 or in the transverse rail-component direction C20. In particular, the connecting portions 21, 22 can be formed in one piece with the cross bar 23. However, provision can also be made for the connecting portions 21, 22 to be configured as separate parts from the cross bar 23 and to be welded, adhesively bonded or connected thereto in some other way.

As is shown in FIG. 7, provision can be made for the cross bar 23 to protrude with respect to the outer faces 21a, 22a of the connecting portions 21, 22 with regard to the transverse rail-component direction C20. Alternatively, however, the cross bar 23 can also end flush with one or both of the outer faces 21a, 22a.

As is shown in particular in FIG. 7, the second rail component 20 can furthermore have a guide device 26. The guide device 26 can be provided, in particular, for guiding an attachment component (not shown), for example a seat for an aircraft or spacecraft. The guide device 26 and the connecting portions 21, 26 are arranged, in particular, on opposite sides of the cross bar 23.

The guide device has a first guide part 27 that protrudes from the cross bar 23 in the vertical rail-component direction H20 or in the vertical profile direction H10, and a second guide part 28 that protrudes from the cross bar 23 in the vertical rail-component direction H20 or in the vertical profile direction H10 and is arranged at a distance from the first guide part 27 with regard to the transverse profile direction C10. The first and the second guide part 27, 28 can be formed, in particular, in one piece with the cross bar 23. However, provision can also be made for the first and the second guide part 27, 28 to be configured as separate parts from the cross bar 23 and to be welded, adhesively bonded or connected thereto in some other way.

As shown in FIG. 7, provision can be made for the first guide part 27 to be connected to the cross bar 23 by way of a first end portion 27A and to have, in a second end portion 27B located at the opposite end from the first end portion 27A, a first end piece 29 that extends in the direction of the second guide part 28. In addition, the second guide part 28 can be connected to the cross bar 23 by way of a first end portion 28A and have, in a second end portion 28B located at the opposite end from the first end portion 28A, a second end piece 30 that extends in the direction of the first guide part 27. The first and the second end piece 29, 30 are arranged at a distance from one another with regard to the transverse rail-component direction C20 or the transverse profile direction C10. In particular, they define a guide recess 31 extending in the longitudinal rail-component direction L20 or in the longitudinal profile direction L10.

The first profile rail 10 can, in addition to the first bar 11, have a second bar 12 extending in the transverse profile direction C10, the second bar 12 being connected to the first bar 11. In particular, the second bar 12 can be arranged in the second end portion 16 of the first bar 11.

Figure 12:
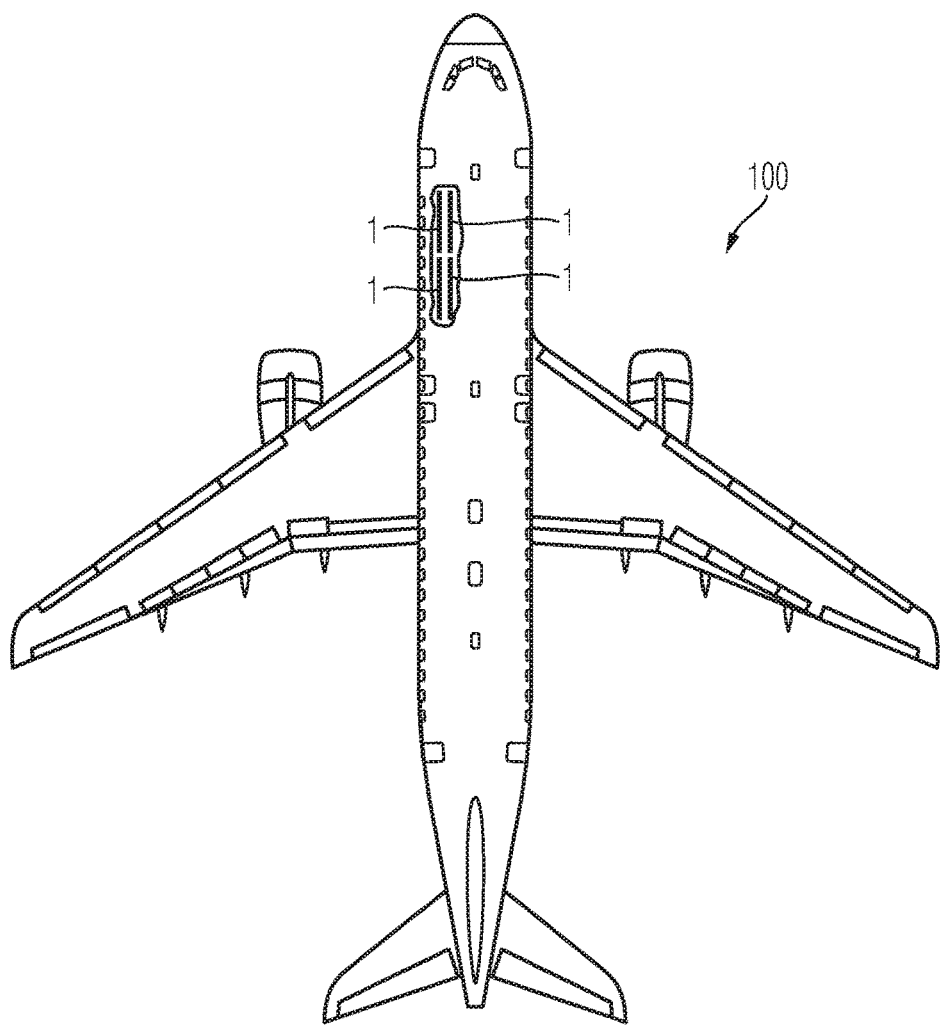
FIG. 12 shows an illustration of an exemplary embodiment of an aircraft according to the present invention.

FIG. 12 shows, by way of example, an aircraft or spacecraft 100 having the hybrid component 1. The hybrid component 1 can be provided, in particular, for connecting passenger seats (not shown) to a fastening structure connected to the aircraft fuselage. In FIG. 12, the aircraft fuselage is illustrated in a cutaway manner and schematically shows an example of an installation situation of the hybrid components 1, in which the hybrid components 1 are provided for connecting the passenger seats to a fastening structure.

Although the present invention was explained above by way of example on the basis of exemplary embodiments, it is not limited thereto but able to be modified in many ways. In particular, combinations of the above exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a rail-shaped hybrid component, the component comprising:
   a first profile rail extending in a longitudinal profile direction and being made of a carbon-fiber reinforced plastic material, said first profile rail having a first bar; and
   a second rail component made of a titanium material, said second rail component having a first connecting portion with a first inner face and a second connecting portion with a second inner face that faces the first inner face and is located at a distance therefrom;
   wherein a bar portion, extending in the longitudinal profile direction of the first bar of the first profile rail, is arranged between the first inner face of the first connecting portion and the second inner face of the second connecting portion, and the first and the second connecting portion of the second rail component are each cohesively connected to the first bar of the first profile rail,
   wherein the first and the second connecting portion of the second rail component are connected together by a cross bar extending in a transverse profile direction extending transversely to the longitudinal profile direction, the method having the following steps of:

positioning the second rail component made of a titanium material on the first bar, extending in a longitudinal profile direction, of the first profile rail that is made of a carbon-fiber reinforced plastic material and moved in an advancing direction, in a fixed position relative to said first profile rail such that a bar portion, extending in the longitudinal profile direction, of the first bar is arranged between the first inner face of the first connecting portion of the second rail component and the second inner face, facing the first inner face and located at a distance therefrom, of the second connecting portion of the second rail component;

cohesively connecting the second rail component to the first profile rail by a predetermined force being exerted perpendicularly on a first outer face, oriented in the opposite direction to the first inner face of the first connecting portion;

applying ultrasonic vibration parallel to the first outer face by means of a first sonotrode of an ultrasonic welding device;

simultaneously exerting a predetermined force perpendicularly on a second outer face, oriented in the opposite direction to the second inner face of the second connecting portion; and applying ultrasonic vibration parallel to the second outer face by means of a second sonotrode of the ultrasonic welding device.

2. The method of claim 1, wherein the sonotrodes are in the form of spot sonotrodes which, during the connecting operation, are moved in the advancing direction from a starting position, at an advancing speed at which the first profile rail is moved in the advancing direction, for a first period of time and, in the process, each produce a first discrete weld that connects the first profile rail and the second rail component.

3. The method of claim 2, wherein, after the production of the first weld, the following steps are carried out:

removing the first sonotrode from the first outer surface and removing the second sonotrode from the second outer surface;

moving the first and the second sonotrode back into the starting position;

exerting the predetermined force perpendicularly on the first outer face and applying ultrasonic vibration parallel to the first outer face by means of the first sonotrode, and simultaneously exerting the predetermined force perpendicularly on the second outer face and applying ultrasonic vibration parallel to the second outer face by means of the second sonotrode, wherein the sonotrodes are moved in the advancing direction at the advancing speed for a second period of time and, in the process, each produce a second discrete weld that connects the first profile rail and the second rail component.

4. The method of claim 1, wherein the sonotrodes are in the form of rolling sonotrodes, wherein, during the connecting process, a first sonotrode roller of the first sonotrode bears against the first outer face and, in the process, produces a first longitudinal weld seam that extends in the longitudinal profile direction and connects the first profile rail and the second rail component, and a second sonotrode roller of the second sonotrode bears against the second outer face and, in the process, produces a second longitudinal weld seam that extends in the longitudinal profile direction and connects the first profile rail and the second rail component.

5. The method of claim 1, wherein the first profile rail has a greater length with regard to the longitudinal profile direction than the second rail component, wherein, in addition, the steps of Positioning a further second rail component on the first bar of the first profile rail in a fixed position relative to said first profile rail such that a further bar portion, extending in the longitudinal profile direction, of the bar is arranged between the first inner face of the first connecting portion of the further second rail component and the second inner face of the second connecting portion of the further second rail component; and cohesively connecting the further second rail component to the first profile rail by a predetermined force being exerted perpendicularly on the first outer face of the first connecting portion of the further second rail component and ultrasonic vibration being applied parallel to this first outer face by means of the first sonotrode, and simultaneously exerting a predetermined force perpendicularly on the second outer face of the second connecting portion of the further second rail component and applying ultrasonic vibration parallel to this second outer face by means of the second sonotrode.

6. The method of claim 1, wherein after the connecting operation, at least one of the first profile rail and the second rail component are cut, in each case, to a predetermined length with regard to the longitudinal profile direction, such that an end face of the second rail component and an end face of the first profile rail are arranged flush with one another with regard to the longitudinal profile direction.

7. The method of claim 1, wherein the first profile rail is moved out of a pultrusion device in which the profile rail was produced by a pultrusion process.

8. A hybrid component comprising:

a first profile rail extending in a longitudinal profile direction and being made of a carbon-fiber reinforced plastic material, said first profile rail having a first bar; and a second rail component made of a titanium material, said second rail component having a first connecting portion with a first inner face and a second connecting portion with a second inner face that faces the first inner face and is located at a distance therefrom;

wherein a bar portion, extending in the longitudinal profile direction of the first bar of the first profile rail, is arranged between the first inner face of the first connecting portion and the second inner face of the second connecting portion, and the first and the second connecting portion of the second rail component are each cohesively connected to the first bar of the first profile rail, wherein the first and the second connecting portion of the second rail component are connected together by a cross bar extending in a transverse profile direction extending transversely to the longitudinal profile direction.

9. The hybrid component of claim 8, wherein the first and the second connecting portion of the second rail component are each cohesively connected to the first bar of the first profile rail by at least one discrete weld.

10. The hybrid component of claim 8, wherein the first and the second connecting portion of the second rail component are each cohesively connected to the first bar of the first profile rail by a longitudinal weld seam extending in the longitudinal profile direction.

11. The hybrid component of claim 8, wherein the hybrid component, in addition to the second rail component, has at least one further second rail component, wherein a further bar portion of the first bar of the first profile rail is arranged between the first inner face of the first connecting portion of the further second rail component and the second inner face of the second connecting portion of the further second rail component, and the first and the second connecting portion of the further second rail component are each cohesively connected to the first bar of the first profile rail.

12. The hybrid component of claim 8, wherein the second rail component has a guide device having a first guide part protruding from the cross bar and a second guide part protruding from the cross bar and arranged in a manner spaced apart from the first guide part with regard to the transverse profile direction, wherein the first guide part is connected to the cross bar by a first end portion and has, in a second portion located at the opposite end from the first end portion, a first end piece extending in the direction of the second guide part, and the second guide part is connected to the cross bar by a first end portion and has, in a second end portion located at the opposite end from the first end portion, a second end piece extending in the direction of the first guide part, wherein the guide device and the connecting portions are arranged on opposite sides of the cross bar.

13. The hybrid component of claim 8, wherein the first profile rail has a second bar extending in the transverse profile direction, said second bar being connected to the first bar.

14. An aircraft or spacecraft having a hybrid component, the hybrid component comprising:
- a first profile rail that extends in a longitudinal profile direction and is made of a carbon-fiber reinforced plastic material, said first profile rail having a first bar; and
- a second rail component made of a titanium material, said second rail component having a first connecting portion with a first inner face and a second connecting portion with a second inner face that faces the first inner face and is located at a distance therefrom;
- wherein a bar portion, extending in the longitudinal profile direction of the first bar of the first profile rail, is arranged between the first inner face of the first connecting portion and the second inner face of the second connecting portion, and the first and the second connecting portion of the second rail component are each cohesively connected to the first bar of the first profile rail, and
- wherein the first and the second connecting portion of the second rail component are connected together by a cross bar extending in a transverse profile direction extending transversely to the longitudinal profile direction.

* * * * *